(12) United States Patent
Breuling et al.

(10) Patent No.: US 9,186,968 B2
(45) Date of Patent: Nov. 17, 2015

(54) ROOF MODULE

(75) Inventors: Andreas Breuling, Calw (DE); Martin Guckel, Neuhausen (DE); Erich Heidt, Renningen (DE); Juergen Schrader, Weil im Schoenbuch (DE)

(73) Assignee: Daimler AG, Stuttgart (DE)

( * ) Notice: Subject to any disclaimer, the term of this patent is extended or adjusted under 35 U.S.C. 154(b) by 863 days.

(21) Appl. No.: 13/388,687

(22) PCT Filed: Jun. 26, 2010

(86) PCT No.: PCT/EP2010/003913
§ 371 (c)(1),
(2), (4) Date: Feb. 23, 2012

(87) PCT Pub. No.: WO2011/015257
PCT Pub. Date: Feb. 10, 2011

(65) Prior Publication Data
US 2012/0141751 A1 Jun. 7, 2012

(30) Foreign Application Priority Data

Aug. 4, 2009 (DE) .................. 10 2009 036 046

(51) Int. Cl.
| | | |
|---|---|---|
| *B32B 3/10* | (2006.01) | |
| *B60J 7/14* | (2006.01) | |
| *B32B 7/04* | (2006.01) | |

(Continued)

(52) U.S. Cl.
CPC ............. *B60J 7/143* (2013.01); *B32B 7/045* (2013.01); *B60J 7/12* (2013.01); *B32B 3/08* (2013.01); *B32B 3/10* (2013.01); *B32B 15/08* (2013.01); *B32B 15/095* (2013.01); *B32B 17/061* (2013.01); *B32B 17/064* (2013.01);
*B32B 2605/006* (2013.01); *B32B 2605/08* (2013.01); *B60J 7/00* (2013.01); *B60J 7/14* (2013.01); *Y10T 428/24777* (2015.01);
(Continued)

(58) Field of Classification Search
USPC .......................................................... 428/192
See application file for complete search history.

(56) References Cited

U.S. PATENT DOCUMENTS 6,491,341 B2 * 12/2002 Grimm et al. ............ 296/216.09
2002/0021029 A1   2/2002 Bohm et al.

(Continued)

FOREIGN PATENT DOCUMENTS

| | | |
|---|---|---|
| DE | 297 04 030 U1 | 7/1997 |
| DE | 102 54 370 B3 | 7/2004 |

(Continued)

OTHER PUBLICATIONS

Machine translation of de 29704030.*

(Continued)

*Primary Examiner* — Gerard Higgins
*Assistant Examiner* — Christopher Polley
(74) *Attorney, Agent, or Firm* — Crowell & Moring LLP

(57) ABSTRACT

A roof module includes a support designed as a closed frame, to which a roof cladding element is fitted and these two components are made to form an assembly by an adhesive bead and joined by a molding made of a material that can be applied while being curable, preferably a thermoplastic polymer. In order to compensate thermal stresses caused by different coefficients of thermal expansion of the components, the molding has contact regions towards the support or the roof cladding element where there is no adhesion between the molding and the component.

15 Claims, 1 Drawing Sheet

(51) Int. Cl.
- *B60J 7/12* (2006.01)
- *B32B 15/08* (2006.01)
- *B32B 15/095* (2006.01)
- *B32B 3/08* (2006.01)
- *B32B 17/06* (2006.01)
- *B60J 7/00* (2006.01)

(52) U.S. Cl.
CPC . *Y10T 428/24793* (2015.01); *Y10T 428/24851* (2015.01); *Y10T 428/24868* (2015.01)

(56) References Cited

U.S. PATENT DOCUMENTS

| | | | |
|---|---|---|---|
| 2006/0055212 A1 | 3/2006 | Schonebeck | |
| 2006/0152032 A1* | 7/2006 | Jurgens | 296/107.01 |
| 2008/0061586 A1* | 3/2008 | Beierl et al. | 296/107.07 |
| 2008/0061853 A1* | 3/2008 | Kim | 327/218 |
| 2010/0007179 A1* | 1/2010 | Fallis et al. | 296/218 |
| 2010/0176625 A1* | 7/2010 | Odoi | 296/223 |

FOREIGN PATENT DOCUMENTS

| | | |
|---|---|---|
| EP | 1 180 471 A2 | 2/2002 |
| EP | 1 180 471 A3 | 2/2002 |
| EP | 1 637 439 A1 | 3/2006 |

OTHER PUBLICATIONS

International Search Report including English language translation dated Dec. 16, 2010 (Four (4) pages).

* cited by examiner

ROOF MODULE

BACKGROUND AND SUMMARY OF THE INVENTION

The invention relates to a roof module for a motor vehicle, in particular for a motor vehicle having a folding top, the roof module comprising several components which act together and are connected to one another.

Such roof modules are used, for example, in convertibles fitted with a folding top, i.e. a top comprising at least two rigid elements that are movable relative to one another.

German Patent Document DE 102 54 370 B3 describes a roof module having a base support in the form of a base frame supporting a roof cladding part and to the lateral edge regions of which further trim parts can be fitted.

Exemplary embodiments of the present invention are directed to a roof module including individual components that can be defined as simply and flexibly as possible and joined to one another in a safe process.

In accordance with exemplary embodiments of the present invention, the individual components of the roof module, in particular the support forming a base structure and a roof cladding element fitted to the support, are joined by means of a molding that can be applied while being curable, wherein the molding has mounting regions towards the support and the roof cladding element and wherein these mounting regions comprise sections with adhesion and sections without adhesion between the molding and the support or the roof cladding element respectively. The term "support" in this context refers to a component of the roof module that contributes at least to the largely rigid structure of the roof module. The essential purpose of the roof cladding element is the implementation of a functionality, such as the overall visual impression or the question of transparency. The phrases "sections with adhesion" and "sections without adhesion" are to be understood to indicate that the molding, in the applied state or during the application process, is not in fixed contact with the support or the roof cladding element respectively, but that in the sections without adhesion there is at least some degree of displaceability and flexibility at the boundary between the molding and the support or the roof cladding element respectively. By means of this displaceability or flexibility, for example, an uncontrolled component deformation, for example caused by thermal expansion, can be prevented or at least reduced. The joining of the support to the roof cladding element by means of the molding which can be applied while being curable can be supported by further related measures for fitting the support and the cladding element to each other. According to the invention, the molding is cured only in the applied position, i.e., in the position in which the support has been joined to the roof cladding element by means of the molding.

In order to define the sections without adhesion, a release agent is provided between the molding and the support or cladding element respectively in an advantageous further development of the invention. By means of such a release agent, the desired effect of sections where the molding is not permanently joined to the support or cladding element respectively can be achieved.

Instead of a separate release agent, it is also possible to make surfaces in contact with one another non-adhesive by using a suitable surface design, in particular in terms of texture.

The sections without adhesion are advantageously located between the molding and the support, because a possible component deformation can here be compensated in a simple way without affecting the sealing functionality of the roof cladding element.

It is further useful if the cladding element and the support are designed as an assembly and are at least already positioned relative to each other by means of suitable joining measures even without the molding. In this context, it is further advantageous if the molding which can be applied while being curable is applied to this assembly or to its individual components by foam encapsulation and/or encapsulation by injection molding. The material for the molding is cured only after its application to the assembly of the roof module which is represented by the support and the cladding element, so that the molding can be produced flexibly.

The molding itself may likewise consist of several components. While particularly defined contours can be produced by encapsulation by injection molding, foam encapsulation offers the advantage that cavity structures can be filled in a simple way.

In an advantageous design, the support and the cladding element forming parts of an assembly are provided with a direct connection which pre-positions these two elements relative to each other. This direct connection is further advantageously represented by an adhesive joint. Adhesive joints can be used safely and flexibly and are produced in a process not involving heat, so that there are no component deformation problems.

In an advantageous further development of the invention, the support of the roof module is designed as a closed frame. This results in a high rigidity combined with a low weight. It is further possible to retain the roof cladding element in a continuous line in a closed frame, resulting in a sealed structure which is free of play and therefore not liable to rattling. For further weight optimization, the support is an Mg die casting. The use of Mg die casting results in a high stability of the support, which has a relatively low weight.

In accordance with an advantageous further development of the invention, the cladding element is a glazing pane, because in a convertible the openness appreciated by users of such vehicles can be simulated even in the closed state of the vehicle by light incidence. The glazing is preferably made of polycarbonate, resulting in low weight and the potential of complete transparency. As the structure of the roof module is ensured by the support, the glazing material can be selected using different criteria, such as weight, transparency, weather resistance etc.

The glazing may further advantageously be a multi-component glazing wherein two glazing panes are preferably placed on top of each other. Between the two glazing panes, electrochromic or photochromic materials can be provided, offering the opportunity to darken the glazing.

One of the two glazing panes can further be used as a shade for optical upgrading in the edge regions of the preferably completely transparent top glazing pane.

It is further useful to design the molding of this roof module as a soft-tooling component, allowing the production of a flexible molding in a simple and cost-effective way.

Further advantages and developments of the invention can be derived from the description of the embodiment illustrated in the drawing and from the appended patent claims.

BRIEF DESCRIPTION OF THE DRAWINGS FIGURES

DETAILED DESCRIPTION

Figure 1:
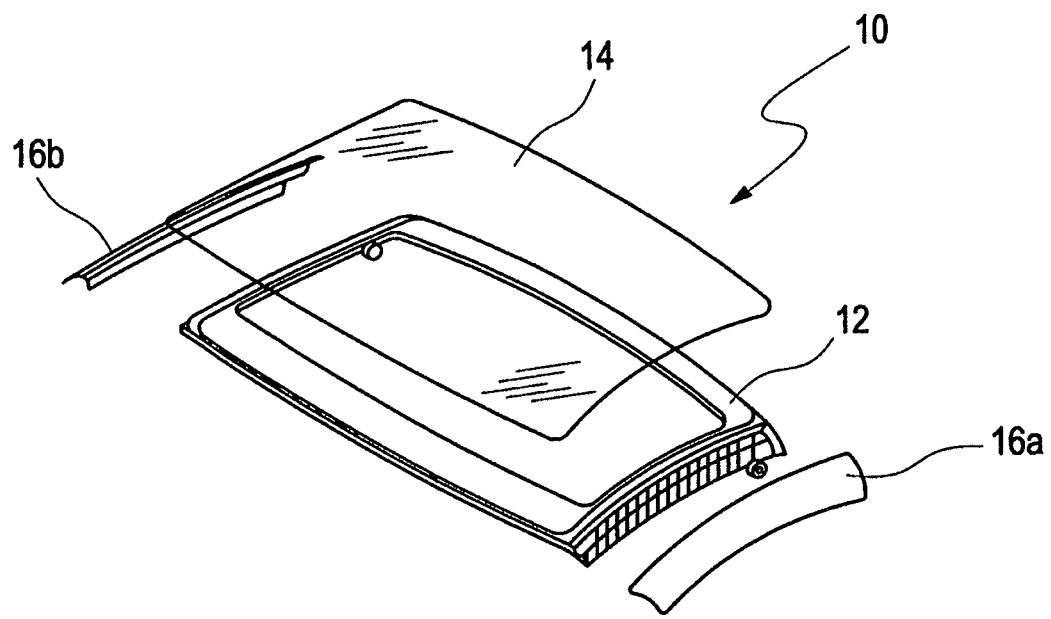
FIG. 1 is an exploded view of the support of a roof module.

FIG. 1 shows a roof module 10 as a part of a folding top of a convertible not shown in the drawing. Folding tops of convertibles consist of at least two largely rigid roof modules hinged to one another and which can, as the roof is being opened, be pivoted into parallel planes in which the individual roof modules are contiguous.

FIG. 1 shows the roof module 10 with a support 12 and a cladding element 14, the support and the cladding element forming an assembly.

The drawing further shows mounting parts 16a, 16b, which can be secured to the right- and left-hand side of the support 12 as viewed in the direction of travel, i.e., the longitudinal direction of the vehicle, for example by clipping in.

The support 12 is designed as a closed, largely rectangular frame. The support is produced from an MG die casting alloy and is in the usual manner primed in a cathodic dip painting process and then powder-coated or provided with a surface coating in another known process.

As the support 12 is not visible in the assembled state of the roof, there is no need to paint it in the vehicle color. Such paint in the vehicle color may be required for the visible side parts 16a, 16b and for the roof cladding element 14.

In the illustrated embodiment, the roof cladding element 14 is made of a transparent plastic material, preferably polycarbonate. It is obvious that the roof cladding element 14 is a design element of the vehicle; it may consist either of a safety glass or of a plastic or sheet metal component painted in the vehicle color.

The exploded view of FIG. 1 shows that the roof cladding element 14 is installed into the support 12 and forms a largely smooth and continuous surface therewith.

The side parts 16a, 16b can also be produced from a lightweight plastic material which may be painted in the vehicle color.

The roof module shown in the drawing is preferably the front part of a folding top consisting of several elements, because in this way the opening in the closed frame forming the support 12, which opening may be provided with a transparent roof cladding element, coincides with the region of the front seats of the vehicle not shown in the drawing.

Figure 2:
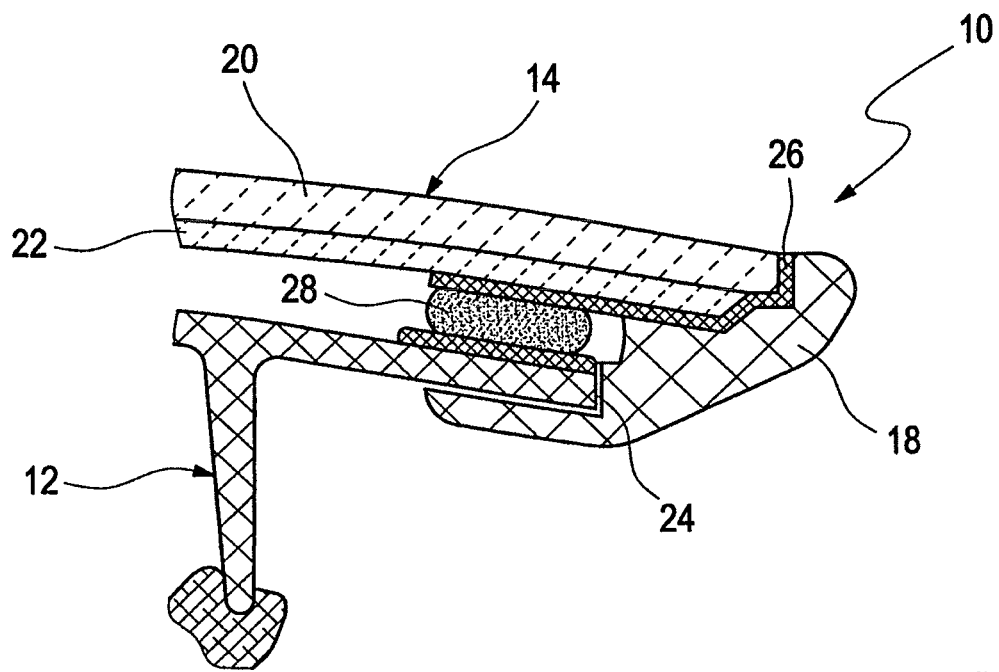
FIG. 2 is a sectional view of the roof module.

FIG. 2 is a sectional view of a part of the roof module 10. This drawing shows particularly clearly how the support 12 designed as an Mg die-cast frame and the at least partially transparent roof cladding element 14 are positioned relative to each other and joined by means of a molding 18.

The roof cladding element 14 is made of multi-component glazing, with an upper pane 20 and a lower pane 22. While the upper pane 20 covers the entire opening of the support 12 designed as a closed frame, the lower pane 22 may either likewise cover the entire opening, thus forming two-component glazing with the upper pane 20, or the lower pane 22 may itself form a frame in the region where the upper pane 20 lies on the support 12, in order to form in this transitional region an optical shade and to coat the transition between the transparent pane and the non-transparent support.

For this purpose, the lower pane 22 may, for example, have a black region. In the same way, the pane 20, if used on its own, may have a dyed-in or printed-on black region for the optical coating of the edge region of the glazing.

The assembly comprising the support 12 and the roof cladding element 14 is surrounded by the molding 18 in a continuous arrangement. The molding 18 is made of a material which can be applied while being curable, such a polyurethane, and is applied by foam encapsulation or injection molding in the soft-tooling process. The polyurethane is cured and forms the molding 18 shown in FIG. 2. The molding 18 continuously surrounds both the roof cladding element 14 and the support 12, thereby positioning these parts with respect to each other.

As the application of polyurethane—another thermoplastic elastomer can be used in the same way—involves heat, the different coefficients of thermal expansion of the support and the roof cladding element may cause stresses or an uncontrolled component deformation with negative effects on the function and the visual qualities of the component as a whole. In order to compensate these stresses, specific contact regions between the molding 18 and the support 12 are designed to be non-adhesive, i.e. in these regions the molding 18 is capable of being displaced relative to the support 12, in particular during the curing process of the polyurethane forming the molding.

In the regions where there is to be no adhesion between the support and the molding, a release agent 24 is provided between the two components in the illustrated embodiment. This release agent may be a coating or an inserted or bonded-on tape.

In the region 26, there is adhesion between the molding 18 and the support 12 or the roof cladding element 14 respectively, in order to transmit the forces required to join the components.

Before the thermoplastic elastomer is applied by injection molding or foam encapsulation, the roof cladding element 14 is pre-positioned on the support 12 by means of an adhesive bead 28, so that the two components form an assembly. As this pre-positioning is to be maintained within the assembly, this is a region where adhesion is present between the components, i.e., a region where there is no compensation for thermally generated stresses.

The concept of the invention is to fit a support designed as a frame to a roof cladding element in a roof module, in particular for a folding roof of a convertible, and to join these components by means of a molding that can be applied while being curable, while avoiding component distortions caused by different coefficients of thermal expansion in the application process, which involves heat.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A roof module for a folding top of a convertible vehicle, comprising:
    a closed frame support having an opening and a pivot element arranged on an exterior perimeter of the closed frame support, wherein the pivot element is configured for connection to an additional roof module of the folding top;
    a roof cladding element located on the closed frame support and overlaying the opening; and
    a molding made of a material that can be applied while being in a curable state, wherein the molding has contact regions with the closed frame support and the roof cladding element and the molding joins the support to the roof cladding element, the contact regions comprising adhesive sections and non-adhesive sections.

2. The roof module according to claim 1, wherein in the non-adhesive sections a release agent is provided between the molding and the closed frame support or between the molding and the roof cladding element.

3. The roof module according to claim 1, wherein the non-adhesive sections are in between the molding and the closed frame support.

4. The roof module according to claim 1, wherein the molding is made by applying the material that can be applied while in a curable state to the closed frame support and the roof cladding element by foam encapsulation and/or encapsulation by injection molding.

5. The roof module according to claim 1, wherein the closed frame support and the roof cladding element are joined directly.

6. The roof module according to claim 1, wherein an adhesive directly joins the closed frame support and the roof cladding element.

7. The roof module according to claim 1, wherein the closed frame support is composed of Mg that has been die casted.

8. The roof module according to claim 1, wherein the roof cladding element is a glazing pane.

9. The roof module according to claim 8, wherein the glazing pane is made of polycarbonate.

10. The roof module according to claim 1, wherein the molding is made using a soft-tooling process.

11. The roof module according to claim 1, wherein the molding is made of a thermoplastic polymer.

12. The roof module according to claim 11, wherein the thermoplastic polymer is polyurethane.

13. The roof module according to claim 1, wherein the closed frame support is not visible in an assembled state of the folding top.

14. The roof module according to claim 1, wherein the pivot element is arranged in a rear portion of the closed frame support.

15. The roof module according to claim 1, wherein the closed frame support and roof cladding located on the closed frame support form an assembly continuously surrounded by the molding.

\* \* \* \* \*